United States Patent [19]
Beckwith

[11] Patent Number: 5,743,399
[45] Date of Patent: Apr. 28, 1998

[54] PLANT TRAY CARRIER

[76] Inventor: David Beckwith, 3416 Lovers La., Dallas, Tex. 75225-7630

[21] Appl. No.: 576,042

[22] Filed: Dec. 21, 1995

Related U.S. Application Data

[63] Continuation of Ser. No. 257,651, Jun. 9, 1994, abandoned.

[51] Int. Cl.$^6$ .................................................. B65D 85/52
[52] U.S. Cl. ........................... 206/423; 206/561; 206/509
[58] Field of Search ........................... 206/423, 557, 206/558, 561, 564, 565, 775, 203, 503, 509

[56] References Cited

U.S. PATENT DOCUMENTS

| | | | |
|---|---|---|---|
| D. 161,815 | 2/1951 | Beeman | 206/561 X |
| 537,853 | 4/1895 | Ramsay | 206/561 |
| 558,432 | 4/1896 | Sonn | 206/561 X |
| 2,286,785 | 6/1942 | Carlson | 206/561 |
| 2,507,366 | 5/1950 | Budai | 206/561 |
| 2,631,747 | 3/1953 | Stolte | 206/509 X |
| 3,379,304 | 4/1968 | Mertz | 206/423 X |
| 3,628,659 | 12/1971 | Mitchell | 206/564 X |
| 3,768,639 | 10/1973 | Dogliotti | 206/564 X |
| 4,118,084 | 10/1978 | Sussman | 206/509 X |
| 4,235,331 | 11/1980 | Bates, III et al. | 206/203 X |
| 5,095,653 | 3/1992 | Guldberg | 206/423 X |
| 5,316,138 | 5/1994 | Thompson | 206/564 X |

Primary Examiner—Jacob K. Ackun
Attorney, Agent, or Firm—L. Dan Tucker

[57] ABSTRACT

The present invention relates to a tray carrier having multiple shelves that extend in a ramp-like manner above a horizontal base portion at an angle of about forty-five degrees. Each shelf can support an otherwise flimsy tray of bedding plants, allowing the plant trays to be easily lifted and carried. The tray carriers can also be stacked on top of one another without damaging the plants by placing the base of an upper tray carrier on the top edge of the shelves of a lower tray carrier. Thus, the tray carriers can be used to transport and display plant trays in a more efficient manner.

7 Claims, 2 Drawing Sheets

PLANT TRAY CARRIER

This application is a continuation, of application Ser. No. 08/257,651, filed on Jun. 9, 1994 entitled Plant Tray Carrier, now abandoned.

FIELD OF THE INVENTION

The present invention relates to a tray carrier, and more particularly to a stackable plant tray carrier having shelves that support plant trays filled with soil and bedding plants, allowing multiple plant trays to be easily lifted and carried, and making the transportation and display of the plant trays more space efficient.

BACKGROUND OF THE INVENTION

Many bedding and nursery plants are grown, shipped and sold in plastic plant trays also known as flats. Each plant tray forms as many as forty eight individual pots that are filled with potting soil and a seed, seedling, or cutting of an appropriate plant. These plant trays are constructed of a thin plastic material to reduce their cost, and they are designed to be stackable when empty. However, plant trays are awkward to lift and carry when fully loaded with plants and soil, and one must generally use both hands to support and balance a single plant tray. Even with this technique, the plant trays are susceptible to being dropped or spilled.

When the young plants are large enough to sell, the plant trays are delivered to nursery and garden centers for sale to a final consumer, but the transportation of the plant trays is hampered by their instability. The plant trays can only be lifted one at a time, so loading and unloading the trays is time consuming. In addition, the plant trays occupy a large horizontal area because they cannot be stacked on top of one another without damaging the plants. Racks having multiple horizontal shelves can be used to stack the plant trays, but the plant trays must be individually loaded and unloaded. In addition, the racks cannot be easily repositioned as desired by the grower or retailer. Thus, growers and retailers have difficulty in displaying and transporting large numbers of plant trays because of the space occupied by the trays, and consumers have difficulty when buying and transporting only a few plant trays.

Several prior attempts have been made to make plant trays easier to carry, display, and transport. For example, U.S. Pat. No. 3,660,934 to Pollack et al discloses a molded expandable breakaway nursery tray and shipping container. This nursery tray is not the industry standard, so retailers and consumers do not have the opportunity to use the disclosed plant tray. Instead, they must use the original tray chosen by the grower. The shipping container does not solve the problems associated with displaying and carrying plant trays.

U.S. Pat. No. 3,866,788 to Smit discloses a welded wire crate for supporting longitudinal troughs of plants used to sprout and grow plants. Thus, the disclosed device is intended for use by the original grower using troughs instead of plant trays. Moreover, the '788 patent does address the problems associated with carrying or transporting fully loaded plant trays.

U.S. Pat. No. 3,927,812 to Winters et al discloses a plant tray having a removable handle. Thus, the problem of lifting and carrying plant trays is recognized, but a non-industry standard plant tray does not help the retailer and consumer that must accept the type of plant tray used by the original grower. In addition, the problems of display and transportation are not addressed.

U.S. Pat. No. 5,141,149 to Fulton discloses a plant shipping and display container, in which stackable units house one plant tray each for shipping and display. The vertical side trays of each unit can be removed to act as a carrying tray for the final consumer. However, the disclosed device does not allow more than one plant tray at a time to be carried.

SUMMARY OF THE INVENTION

The present invention relates to a tray carrier having two or more shelves that extend in a ramp-like manner above a horizontal base portion at an angle of between about twenty degrees to about sixty degrees. Each shelf can support at least one plant tray, so the tray carrier allows several of the normally flimsy plant trays to be easily lifted and carried. The shelves can be parallel to one another, or they can extend away from the mid-point of the base portion. Tray carriers with two to four shelves can be carried by one person, and a centrally disposed handle allows the tray carrier to be lifted with one hand. Larger tray carriers having more than four shelves are usually carried by at least two people, so they include handles or handgrips at each end of the carrier.

The tray carriers can be stacked one on top of another without damaging the plants by resting the base portion of an upper tray carrier on the top edge of the shelves of a lower tray carrier. The bottom surface of the base portion can be configured to cooperate with the top edges of the shelves to align and stabilize the stacked arrangement of tray carriers. Thus, the tray carrier makes transportation and display of the plant trays more space efficient.

The plant tray carriers can be made of any durable material including wood, plastic, and metal, or a disposable material such as corrugated cardboard can be used to produce a disposable plant tray. Preferably, the shelves and base portion are integrally formed of injection molded plastic. In addition, the handles and shelves can be adjustable or removable, and the tray carriers can include a small storage area for carrying items other than plant trays.

BRIEF DESCRIPTION OF THE DRAWINGS

For a more complete understanding of the present invention, and for further details and advantages thereof, reference is now made to the following detailed description taken in conjunction with the following drawings, in which.

DETAILED DESCRIPTION OF THE DRAWINGS

The present invention relates to a tray carrier that can support multiple plant trays filled with soil and bedding plants, so that the plant trays can be easily carried. Moreover, the tray carriers can be stacked one on top of each other, so the transportation and display of the plant trays is more space efficient.

Figure 1:
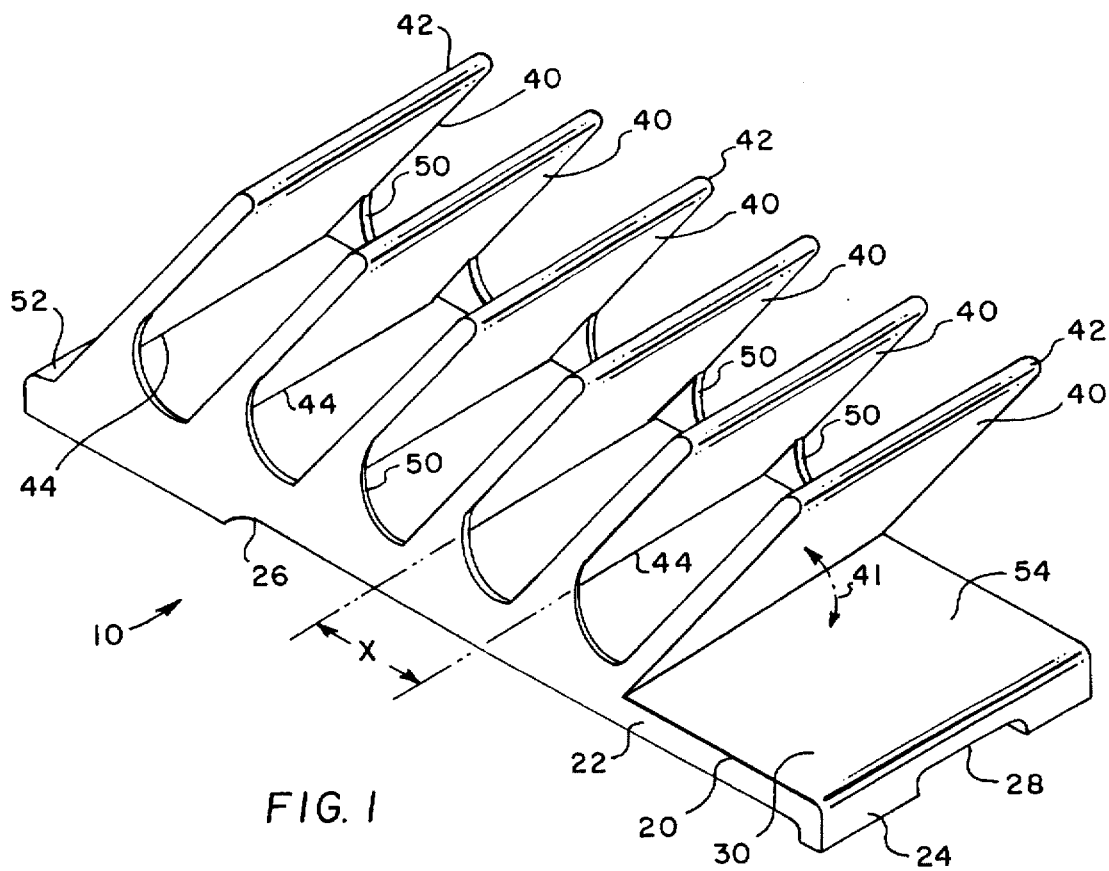
FIG. 1 is a perspective view of a plant tray carrier constructed in accordance with the present invention.

FIG. 1 is a perspective view of tray carrier 10 having base 20 that defines oppositely disposed base sides 22 and base ends 24. Each base side 22 includes indention 26, and each base end 24 includes indention 28. The top surface of base 20 is designated as 30. Shelves 40 extend upward from base 20 at an angle of inclination 41 of about forty-five degrees, and each shelf 40 has shelf top 42 and shelf bottom 44. Adjacent shelves 40 have base spacing distance X as measured along top surface 30 of base 20. Side retainers 50 extend between adjacent shelves 40. Base 20 extends forward of shelves 40 as designated with 52 and rearward of shelves 40 as designated with 54.

Figure 2:
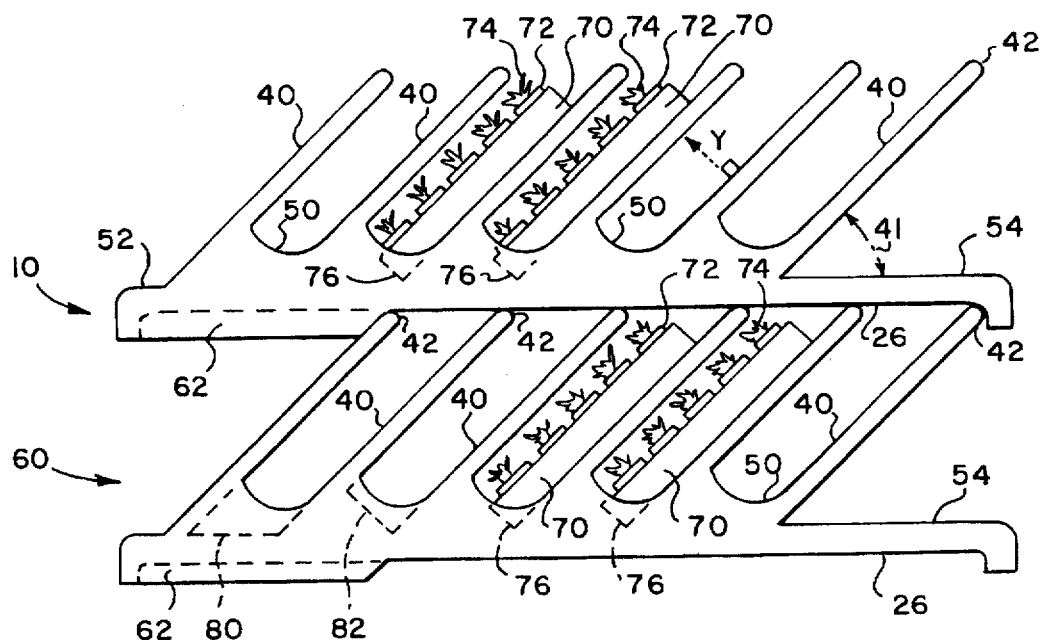
FIG. 2 is a front view of first plant tray carrier as shown in FIG. 1 stacked on a second plant tray carrier.

FIG. 2 is a front view of a first tray carrier 10 as shown in FIG. 1 stacked on top of an identical tray carrier 60. Shelf tops 42 of second tray carrier 60 cooperate with indentions 26 on base sides 22 of tray carrier 10. Base side 22 includes ledges 62. Plant trays 70 having individual growing pots 72 and plants 74 are supported by shelves 40 of tray carriers 10 and 60. The lower edges 76 of plant trays 70 extend below side retainers 50 and contact top surfaces 30 of bases 20. Top surface 30 of base 20 can define horizontal surface 80 between shelves 40 or angled surface 82 to conform to the lower edge 76 of plant tray 70. Shelf spacing distance Y is the distance between adjacent shelves 40 as measured on line perpendicular with the surfaces of shelves 40.

Figure 3:
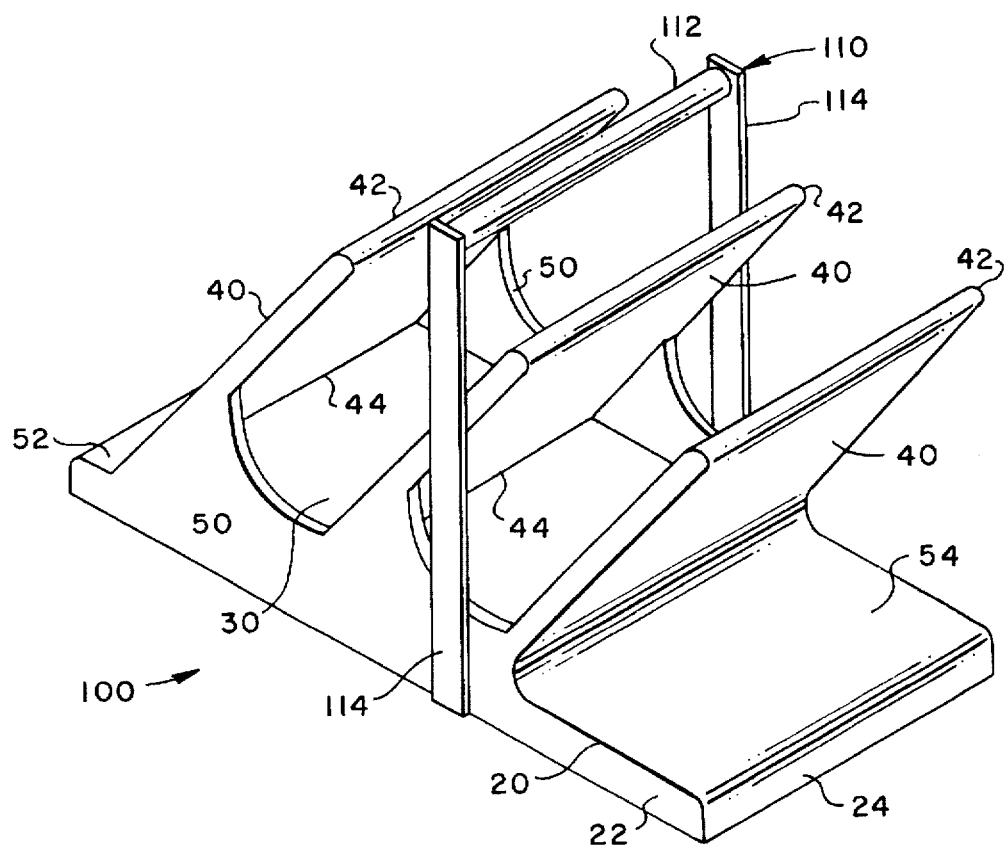
FIG. 3 is a perspective view of an alternative embodiment of a plant tray carrier constructed in accordance with the present invention.

FIG. 3 is a perspective view of tray carrier 100 which is a first alternative embodiment from tray carrier 10 of FIG. 1. Tray carrier 100 includes base 20 with oppositely disposed base sides 22, base ends 24, and top surface 30. Shelves 40 extend upward from base 20 at an angle of inclination 41 of about forty-five degrees, and each shelf 40 has shelf top 42 and shelf bottom 44. Side retainers 50 extend between adjacent shelves 40. Handle means 110 includes handle member 112 and attaching members 114.

Figure 4:
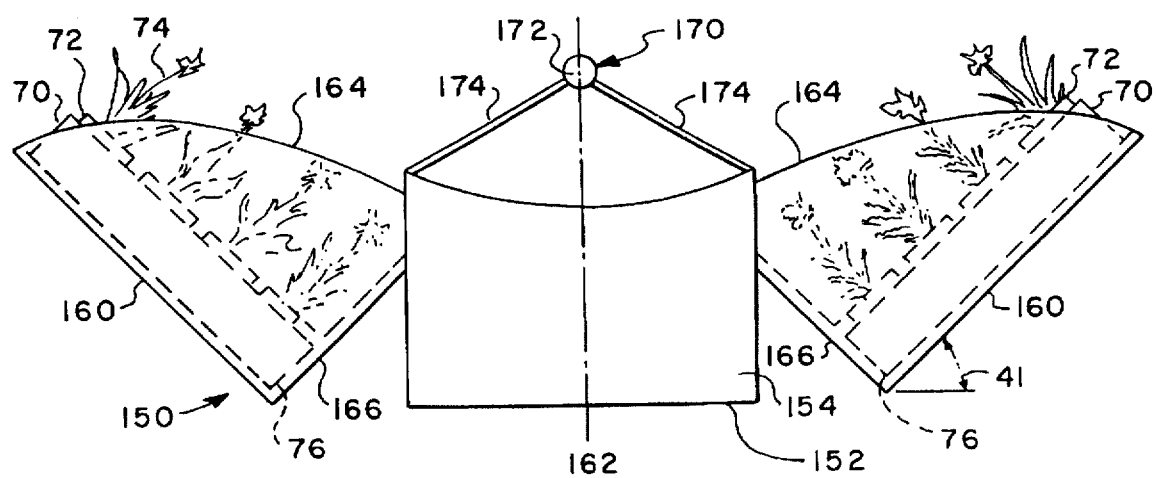
FIG. 4 is a front view of a second alternative embodiment of a plant tray carrier constructed in accordance with the present invention.

FIG. 4 is a front view of tray carrier 150 which is a second alternative embodiment from tray carrier 10 of FIG. 1. Tray carrier 150 includes base portion 152 and side walls 154. Shelves 160 extend upward from base portion 152 and side walls 154 at an angle of inclination 41 of about forty-five degrees and away from midpoint 162 of base 152. Side retainers 164 extend from each shelf 160 to side wall 154. Plant trays 70 with individual pots 72 and plants 74 are supported on shelves 160, and lower edge 76 of each plant tray 70 is resting on angle surface 166. Handle means 170 includes handle member 172 and attaching members 174.

Shelves 40 have substantially the same width as base 20, and shelves 40 attach to top surface 30 of base 20 with shelf bottoms 44 extending across the width of base 20. Shelves 40 are intended to support at least one plant tray 70 filled with soil and plants 74, and because plant trays 70 have an average size of about fourteen and one-half inches by twenty-one inches with a height of about 2.5 inches, shelves 40 should be about fourteen and one-half inches by about twenty-one inches. However, if the size of the industry standard changes or if tray carriers 10 and 100 are needed for use with plant trays 70 having a different standard size, shelves 40 should be dimensioned accordingly. Side retainers 50 prevent plant trays 70 from sliding off the sides of shelves 40.

Shelves 40 extend upward from base 20 at angle 41, so the length of base 20 is shorter than would be required if plant trays 70 were laid horizontally side-by-side. Preferably, angle 41 is between about twenty and sixty degrees, and more preferably angle 41 is about forty-five degrees so that plant trays 70 can be supported on shelves 40 without collapsing under their own weight and without spilling. Angle 41 can be greater or less than about forty-five degrees depending on strength of plant tray 70, the combined height of plant tray 70 and plant 74, and the desired length of base 20. As angle 41 is reduced from about forty-five degrees, shelf spacing distance Y is also reduced if the base spacing distance X remains constant. As angle 41 is increased from about forty-five degrees, the weight placed on lower edge 76 of plant trays 70 increases, and plant trays 70 are more likely to fall against the next adjacent shelf 40, damaging plants 74. Angled surface 82 protects and supports lower edge 76 of plant trays 70 better than horizontal surface 80.

Shelf spacing distance Y must be sufficient to allow multiple trays to be supported without contacting each other. Because the plant trays 70 have a height of about 2.5 inches, shelf spacing distance Y is at least about 2.5 inches. A preferable shelf spacing distance Y between parallel shelves 40 is at least about 3 inches and not more than about 8 inches. More preferably, shelf spacing distance Y between parallel shelves 40 is at least about 4 inches and not more than about 6 inches. Shelf spacing distance Y can be greater to protect taller plants 74. Base spacing distance X is a function of the angle of inclination 41 and shelf spacing distance Y.

Tray carrier 10 is shown in FIG. 1 to have six shelves, and tray carrier 100 is shown in FIG. 3 to have three shelves. However, the number of shelves on a tray carrier can vary depending on the needs of the specific user. Even tray carrier 100 with only a single shelf 40 would allow a single plant tray 70 to be carried with one hand by using handle means 110. Preferably, tray carriers 10 and 100 have two to four shelves if intended to be carried by one person or five to eight shelves if they are intended to be carried by two or more people. Thus, one person can conveniently carry one to four plant trays 70, and two people can conveniently carry four to eight plant trays 70.

Tray carriers 10 and 100 have shelves 40 extending in the same direction from base 20 so that all shelves 40 are substantially parallel. Several tray carriers 10 can be placed end to end so that base surface 52 of a first tray carrier 10 abuts base surface 54 of a second tray carrier 10, and a plant tray 70 could then be supported by the front-most shelf 40 of the first tray carrier 10. In the alternative, base surface 52 can include an angled surface 82 so that the frontmost shelf 40 can support a plant tray 70, and base surface 54 can be dimensioned to support one plant tray 70 in a horizontal position. For tray carriers having shelves 40 extending in the same direction, the center of gravity may not be disposed on the midpoint of base 20.

Tray carrier 150 is similar to tray carriers 10 and 100 in most regards. Shelves 160 extend from base 152 at an angle of about forty-five degrees. Shelves 160 are dimensioned to each support one plant tray 70. Tray carrier 150 preferably has two to six shelves 160, and more preferably tray carrier 150 has two shelves 160. Side retainers 164 function as side retainers 50. The primary difference between tray carrier 150 and the previous embodiments is that each shelf 160 extends away from mid-point 162 of base 152. Thus, shelves 160 on one side of mid-point 162 are perpendicular to the shelves 160 on the opposite side of mid-point 162 when angle of inclination 41 is about forty-five degrees. Of course, shelves 160 can be disposed at angles other than forty-five degrees in a manner similar to tray carriers 10 and 100. If more than two shelves 160 are included on tray carrier 150, an even number of shelves should be used, and the shelves should be equally distributed across mid-point 162. The spacing distance of adjacent and parallel shelves 160 on each side of mid-point 162 is substantially equivalent to shelf spacing distance Y for adjacent shelves 40 of tray carriers 10 and 100. The spacing distance of adjacent shelves 160 disposed across mid-point 162 should be sufficient to prevent the supported trays from contacting each other and to prevent damage to plants 74. Preferably, the spacing across mid-point 162 is greater than necessary to protect plants 74, and a small storage area is defined by base 152, side walls 154, and shelves 160. Retail consumers can use the small storage area for items they wish to carry in addition to plant trays 70. Because tray carrier 150 is intended for use by retail consumers, shelves 160 can be smaller than the larger plant trays used in the plant and nursery industry. The orientation of shelves 160 places the center of gravity of tray carrier 150 directly over mid-point 162 making the tray carrier 150 easy to lift and support.

A handle means facilitates lifting and carrying tray carriers 10, 100, and 150. The handle means of tray carrier 10 includes end indentions 28 which act as handgrips for lifting and supporting the tray. Indention 28 can be narrow for gripping with one hand, or it can be wide for gripping with two hands. Alternatively, indentions 28 can be placed on side surface 22 of base 20 to form two widely spaced hand grips at each end of base 20. Instead of indentions 28 on base 20, the front-most and rear-most shelves 40 can include handgrips near shelf tops 42. Tray carrier 100 includes handle means 110 to allow the tray carrier to be lifted and carried by one person. Handle member 112 is preferably disposed over the center of gravity of tray carrier 100 when fully loaded with plant trays 70, and attaching members 114 attach handle member 112 to tray carrier 100. Handle member 112 can traverse the width of base 20 as shown in FIG. 3, or handle member 112 can traverse the length of base 20. Handle means 170 of tray carrier 150 is substantially equivalent to handle means 110. Handle means 170 includes two attaching members 174 at each end of handle member 172 for greater stability. Attaching members 114 and 174 can be constructed of rigid or flexible material, and they can attach the handle members to shelves or to the base position.

The handle means of tray carriers 10, 100, and 150 can assume many configurations, and many equivalent structures can be used. The function of the handle means is to allow the tray carrier to be conveniently lifted and carried. Handgrips such as end indentions 28 are convenient for tray carriers that are intended to be carried by more than one person, and the handgrips do not interfere with stacking multiple tray carriers as shown in FIG. 2. Instead of handgrips, the handle means for tray 10 can include handle members extending upward at each end of base 20. Handle means 110 and 170 of tray carriers 100 and 150, respectively, can be fixed in place, or they can be adjustable, collapsible, or removable. In particular, attaching members 114 and 174 can pivot on the base member to allow handle members 112 and 172 to be moved to one end of the tray carrier.

Tray carrier 10 is stacked on tray carrier 60 by resting base 20 of the upper tray carrier 10 on shelf tops 42 of the lower tray carrier 60. Thus, the length of shelves 40 from shelf bottom 44 to shelf top 42 should be sufficient to prevent damage to plant trays 70 and plants 74 when multiple tray carriers are stacked on one another. The bottom of base 20 is also configured to facilitate stacking by mating or cooperating with the shelf tops 42 of the lower tray carrier 60. Preferably, base 20 includes side indentions 26 that conform to the shelf tops 42 of the front-most and rear-most shelves 40. Alternatively, ledge 62 can extend around the periphery of base 20, and the shelves 40 could be confined within the oppositely disposed ledges 62. In this configuration, shelves 40 could be slightly narrower than base 20 to fit with ledges 62, or shelf tops 42 can include a notch on each corner to correspond with ledges 62. In a second alternative embodiment, tray carrier 10 includes several grooves on the bottom of base 20, each groove corresponding to a shelf top 42 of the lower tray carrier 60. Tray carriers 100 and 150 can be similarly configured to facilitate stacking. In particular, attaching members 114 and 174, when handle members 112 and 172 have been removed, can engage the sides of the base of an upper tray carrier when they are stacked. Tray carrier 150 can also include an aperture in base 152 that can receive handle means 170 of a lower tray carrier when stacked.

For more efficient transportation of plant trays 70, base 20 of tray carrier 10 can be dimensioned to correspond to the measurements of the cargo bay of a selected vehicle. Therefore, very little volume of the cargo bay is wasted, and loading and unloading is easier since plant trays 70 are not removed from the tray carriers. In a similar fashion, tray carriers 100 and 150 can be dimensioned to easily fit in the trunk of most automobiles since these smaller carriers are intended for the final purchaser.

Tray carriers 10, 100, or 150 are preferably constructed of a durable and washable material. More preferably, the tray carriers are constructed of plastic, wood, or metal, and even more preferably, the base portion, shelves, and handle means are integrally formed of injection molded plastic. Cardboard and other inexpensive material can be used to construct disposable tray carriers.

Tray carriers 10, 100, and 150 provide improvements in transportation, display and storage of plant trays 70. The transportation of plant trays 70 is difficult because plant trays 70 are not stackable. Racks that have several horizontal shelves do not support supported plant trays 70 while they are being loaded and unloaded from the shelves. Likewise, the display and storage of plant trays 70 require large amounts of space. The tray carriers 10, 100, and 150 of the present invention provide a solution for each of these problems. As previously discussed, the angled shelves 40 and 160 allow the length of bases 20 and 152 to be shorter than if plant trays 70 were horizontal, and the tray carriers 10, 100, and 150 are stackable. Therefore, a large number of plant trays 70 can be stacked in a small area for transportation, display or storage without damaging plants 74, and plant trays 70 are fully supported each time they are moved. In addition, the open top and sides of the tray carriers of the present invention make loading and unloading of the tray carriers easier than racks of horizontal shelves.

Other improvements and modifications are encompassed by the present invention. For example, shelves 160 of tray carrier 150 can be disposed toward mid-point 162, instead of away from it, to create a storage area under the inner-most two shelves, and the outermost shelves can form angled surface 166 to support a plant tray 70. In addition, the shelves of tray carriers 10, 100, and 150 can pivot on the base member to assume different angles or to lay flat for storage. The shelves can also be removable from the base member to provide a tray carrier with a variable number of trays and variable tray spacing.

The present invention has been described in the context of its benefits in the plant and nursery industries. However, the tray carrier can be used in any industry as a device to aid the support, transportation, and storage of items. Additionally, tray carrier 10 can have only one shelf extending above the base portion, with ability to place adjacent shelves nearby. The adjacent shelves can extend from the same base portion or from a different tray carrier.

It will be appreciated that by forming the shelves 40 of the plant tray carrier in a tapered shape and by injection molding such tray carriers, the carriers can be nested together when not in use. This nesting capability will facilitate storage and shipment of the tray carriers.

Although preferred embodiments of the invention have been described in the foregoing detailed description and illustrated in the accompanying drawings, it will be understood that the invention is not limited to the embodiments disclosed but is capable of numerous rearrangements, modifications and substitutions of parts and elements without departing from the spirit of the invention. Accordingly, the present invention is intended to encompass such rearrangements, modifications and substitutions of parts or elements as fall within the scope of the invention.

I claim:

1. A tray carrier comprising:

a base portion and sidewalls;

first and second tray shelves extending upwardly from the plane of said base portion, said first and second tray shelves extending away from the midpoint of said base portion in opposing inclined relationship on opposite sides of said midpoint;

first and second angled surface members, each of said first and angled surface members orthogonally connected to said first and second tray shelves, respectively; and a handle means connected to said sidewalls for lifting and carrying the tray carrier;

wherein a first plant tray supported by said first tray shelve and said first angled surface member is in an opposingly inclined relationship with a second plant tray supported by said second tray shelve and said second angled surface member.

2. The tray carrier of claim 1 wherein said shelves are inclined at an angle of about forty-five degrees from the plane of said base portion.

3. A plant tray carrier, comprising:

a base portion having a top side surface, a bottom side surface and first and second edge side surfaces;

said bottom side surface of said base portion having an interior sidewall which defines an indentation in said base portion, said indentation configured to receive top ends of shelves of a second, similarly constructed, plant tray carrier and a portion of said interior sidewall configured to engage a top side surface of a first shelve of said second plant tray carrier when said plant tray carrier is stacked on said second plant tray carrier;

at least two generally planar shelves, each of said at least two shelves having a length and extending upwardly, along said length, from said top side surface of said base portion at an acute angle thereto;

said at least two shelves being generally parallel to each other along the entirety of said lengths;

said at least two shelves being spaced apart from one another such that a plant tray placed on a top side surface of a first one of said at least two shelves does not contact a bottom side surface of an adjacent one of said at least two shelves;

a first retaining wall connected to said first edge side surface of said base portion and part of said first edge side surface of each of said at least two shelves; and a second retaining wall connected to said second edge side surface of said base portion and part of said second edge side surface of each of said at least two shelves;

said first and second retaining walls preventing plant trays placed on top said surfaces of said at least one shelves from sliding off of said plant tray carrier.

4. A plant tray carrier according to claim 3 and further comprises:

a handle member, for lifting and carrying said plant tray carrier, said handle disposed above, and positioned over a portion of, said top edge surface of each of said at least two shelves;

a first attaching member, said first attaching member attaching said handle member to said first edge side surface of said base portion; and a second attaching member, said second attaching member attaching said handle member to said second edge side surface of said base portion.

5. A plant tray carrier according to claim 4 wherein first and second hand grips are respectively formed in said first and second edge surfaces of said base portion.

6. A stackable plant tray carrier system, comprising:

a first plant tray carrier, said first plant tray carrier comprising:

a base portion having a top side surface, a bottom side surface and first and second edge side surfaces;

said bottom side surface of said base portion having an interior sidewall which defines an indentation;

at least two generally planar shelves, each of said at least two shelves having a length, a top end and extending upwardly, along said length, from said top side surface of said base portion at an acute angle thereto;

said at least two shelves being generally parallel to each other along the entirety of said lengths;

said at least two shelves being spaced apart from one another such that a plant tray placed on a top side surface of a first one of said at least two shelves does not contact a bottom side surface of an adjacent one of said at least two shelves;

a second plant tray carrier, said second plant tray carrier comprising:

a base portion having a top side surface, a bottom side surface and first and second edge side surfaces;

said bottom side surface of said base portion having an interior sidewall which defines an indentation;

at least two generally planar shelves, each of said at least two shelves having a length, a top end and extending upwardly, along said length, from said top side surface of said base portion at an acute angle thereto;

a first retaining wall connected to said first edge side surface of said base portion and part of said first edge side surface of each of said at least two shelves; and a second retaining wall connected to said second edge side surface of said base portion and part of said second edge side surface of each of said at least two shelves;

said first and second retaining wall preventing plant trays placed on said top side surfaces of said at least one shelves from sliding off of said first plant tray carrier;

said at least two shelves being generally parallel to each other along the entirety of said lengths;

said at least two shelves being spaced apart from one another such that a plant tray placed on a top side surface of a first one of said at least two shelves does not contact a bottom side surface of an adjacent one of said at least two shelves;

said indentation of said first plant tray carrier receiving said top ends of said second plant tray carrier and a portion of said interior sidewall of said first plant tray carrier engaging said top side surface of a first shelve of said second plant tray carrier when said first plant tray carrier is stacked on said second plant tray carrier.

7. A plant tray carrying system according to claim 6 wherein said second plant tray carrier further comprises:

a first retaining wall connected to said first edge side surface of said base portion and part of said first edge side surface of each of said at least two shelves; and a second retaining wall connected to said second edge side surface of said base portion and part of said second edge side surface of each of said at least two shelves;

said first and second retaining wall preventing plant trays placed on said top side surfaces of said at least one shelves from sliding off of said second plant tray carrier.

* * * * *